United States Patent
Chung et al.

(10) Patent No.: US 9,141,233 B2
(45) Date of Patent: Sep. 22, 2015

(54) TOUCH CONTROLLED DISPLAY DEVICE

(75) Inventors: Jin-Koo Chung, Yongin (KR); Sang-Soo Kim, Yongin (KR); Sung-Kee Kang, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 264 days.

(21) Appl. No.: 12/946,773

(22) Filed: Nov. 15, 2010

(65) Prior Publication Data
US 2011/0227873 A1 Sep. 22, 2011

(30) Foreign Application Priority Data
Mar. 17, 2010 (KR) .................. 10-2010-0023900

(51) Int. Cl.
*G06F 3/042* (2006.01)
*G06F 3/041* (2006.01)
*G02F 1/1333* (2006.01)

(52) U.S. Cl.
CPC .......... *G06F 3/0425* (2013.01); *G02F 1/13338* (2013.01); *G06F 3/0412* (2013.01); *G02F 2201/58* (2013.01); *G06F 2203/04109* (2013.01)

(58) Field of Classification Search
CPC .................................................... G06F 3/0412
USPC ......................................................... 345/173
See application file for complete search history.

(56) References Cited

U.S. PATENT DOCUMENTS

| 7,515,143 | B2 | 4/2009 | Keam et al. |
| 8,441,467 | B2 | 5/2013 | Han |
| 2005/0052435 | A1* | 3/2005 | Cho et al. ........................ 345/182 |
| 2005/0245302 | A1 | 11/2005 | Bathiche et al. |
| 2008/0122803 | A1* | 5/2008 | Izadi et al. ..................... 345/175 |
| 2008/0284925 | A1* | 11/2008 | Han ................................. 349/12 |
| 2009/0200921 | A1* | 8/2009 | Lee et al. ....................... 313/504 |
| 2009/0268132 | A1 | 10/2009 | Takama et al. |
| 2010/0283765 | A1 | 11/2010 | Gotoh et al. |
| 2012/0092302 | A1* | 4/2012 | Imai et al. ...................... 345/175 |

FOREIGN PATENT DOCUMENTS

| JP | 10303722 | 11/1998 |
| JP | 2000-331557 A | 11/2000 |
| JP | 2009-528570 A | 8/2009 |
| JP | 2009-545828 A | 12/2009 |
| KR | 1020070024969 A | 8/2007 |
| KR | 1020090038413 A | 4/2009 |
| KR | 20090051613 A | 5/2009 |
| TW | 200846996 A | 12/2008 |
| TW | 201003590 A | 1/2010 |
| WO | 2007013272 | 2/2007 |
| WO | 2009110293 | 9/2009 |

* cited by examiner

*Primary Examiner* — Mark Regn
(74) *Attorney, Agent, or Firm* — Knobbe Martens Olson & Bear LLP

(57) ABSTRACT

A touch controlled display device is disclosed. The device comprises: a display panel including a display panel including a first surface, a second surface opposing the first surface and a plurality of pixels between the first and second surfaces, each pixel including a transmission area and a display area, the transmission area being configured to transmit light therethrough, an infrared source located on the side of the second surface of the display panel and configured to irradiate infrared light toward the first surface through the second surface, and an infrared sensor located on the side of the second surface of the display panel and configured to detect infrared light from the first surface through at least one transmission area of the plurality of pixels.

4 Claims, 9 Drawing Sheets

TOUCH CONTROLLED DISPLAY DEVICE

CROSS-REFERENCE TO RELATED APPLICATIONS

This application claims priority to and the benefit of Korean Patent Application No. 10-2010-0023900 filed in the Korean Intellectual Property Office on Mar. 17, 2010, the entire contents of which are incorporated herein by reference.

BACKGROUND

1. Field

The described technology relates generally to a touch controlled display device using infrared.

2. Description of the Related Technology

A touch controlled display device is a device for which the control is achieved through touch. Touch controlled display devices using infrared have recently become popular.

Generally, touch controlled display devices using infrared include a display device for displaying images, an infrared source for irradiating infrared to an image displaying part, and an infrared sensor for sensing the infrared reflected from the image displaying part.

A screen display device for displaying images on the screen by using a projector, or a liquid crystal display (LCD) including an liquid crystal panel for displaying images using liquid crystal, and a backlight unit for irradiating light to the liquid crystal panel have generally been used.

Touch controlled display devices using infrared including a screen display device may provide unsatisfactory quality of images emitted from the projector and displayed on the screen, because of the technical limits of the projectors used. Such devices may also use a predetermined space between the projector and the screen, and hence the size of the touch controlled display device may be enlarged.

In infrared touch controlled display devices including a liquid crystal display (LCD), infrared irradiated from an infrared source may be transmit through the liquid crystal panel and infrared reflected from the liquid crystal panel may also be transmitted through the liquid crystal panel. Transmittance of infrared to the liquid crystal panel may be deteriorated by the shutter function of the liquid crystal included in the liquid crystal panel. If transmittance of the infrared to the liquid crystal panel is deteriorated, the recognition rate of touch for the touch controlled display device may be deteriorated.

The information disclosed in this Background section is merely for enhancement of understanding of the background of the described technology.

SUMMARY OF CERTAIN INVENTIVE ASPECTS

The described technology has been made in an effort to provide a touch controlled display device using infrared as a touch recognition means having improved display quality, a slimmer size, improved infrared transmittance, and improved touch recognition rate.

One aspect is a touch controlled display device including: a display panel including a first surface, a second surface opposing the first surface and a plurality of pixels between the first and second surfaces, each pixel including a transmission area and a display area, the transmission area being configured to transmit light therethrough, an infrared source located on the side of the second surface of the display panel and configured to irradiate infrared light toward the first surface through the second surface, and an infrared sensor located on the side of the second surface of the display panel and configured to detect infrared light from the first surface through at least one transmission area of the plurality of pixels.

The touch controlled display device may further include an infrared transmission layer between the display panel and the infrared sensor, the infrared transmission layer being configured to transmit infrared light and to substantially block light of other wavelengths.

The display area may be at least partially overlapping with the transmission area.

The transmission area of each pixel may be configured to transmit infrared light from the source directed to the first surface of the display panel.

The touch controlled display device may further include a sensing plate provided over the second opposing surface, where the infrared sensor is provided on the sensing plate.

A touch controlled display device, including: a display panel including a first surface, a second surface opposing the first surface and a plurality of pixels between the first and second surfaces, each pixel including a transmission area and a display area, the transmission area being configured to transmit light therethrough, a total reflection plate over the first surface, an infrared source configured to irradiate infrared light into the total reflection plate such that the infrared light travels along the first surface within the total reflection plate, and an infrared sensor located on the side of the second surface of the display panel and configured to detect infrared light directed from the total reflection plate through at least one transmission area of the plurality of pixels in response to a touch on the total reflection plate.

The touch controlled display device may further include an infrared transmission layer between the display panel and the infrared sensor, the infrared transmission layer being configured to transmit infrared light and to substantially block light of other wavelengths.

A touch controlled display device including: a display panel including a first surface, a second surface opposing the first surface, and a pixel array interposed between the first and second surfaces, the first surface providing a touch control surface, the pixel array includes a plurality of transmissive areas therein, an infrared source for irradiating infrared light, where the infrared source is located on the side of the second surface of the display panel and configured to irradiate infrared light toward the first surface through at least part of the transmissive areas, and an infrared sensor for detecting infrared light, where the infrared sensor is located on the side of the second surface of the display panel and configured to detect infrared light reflected by a touch of the first surface and directed toward the infrared sensor through at least part of the transmissive areas.

The pixel array may include a first electrode, a second electrode, and an organic emission layer between the first and second electrodes, the organic emission layer configured to emit light.

The device may further include an infrared transmission layer between the display panel and the infrared sensor, the infrared transmission layer being configured to transmit infrared light and to substantially block light of other wavelengths.

The pixel array may include a pixel, which further includes a display area neighboring the transmissive area and configured to emit light.

The display area may be at least partially overlapping with the transmission area.

The device may further include a sensing plate provided on the second surface, where the infrared sensor is provided on the sensing plate.

DETAILED DESCRIPTION OF CERTAIN INVENTIVE EMBODIMENTS

Figure 1:
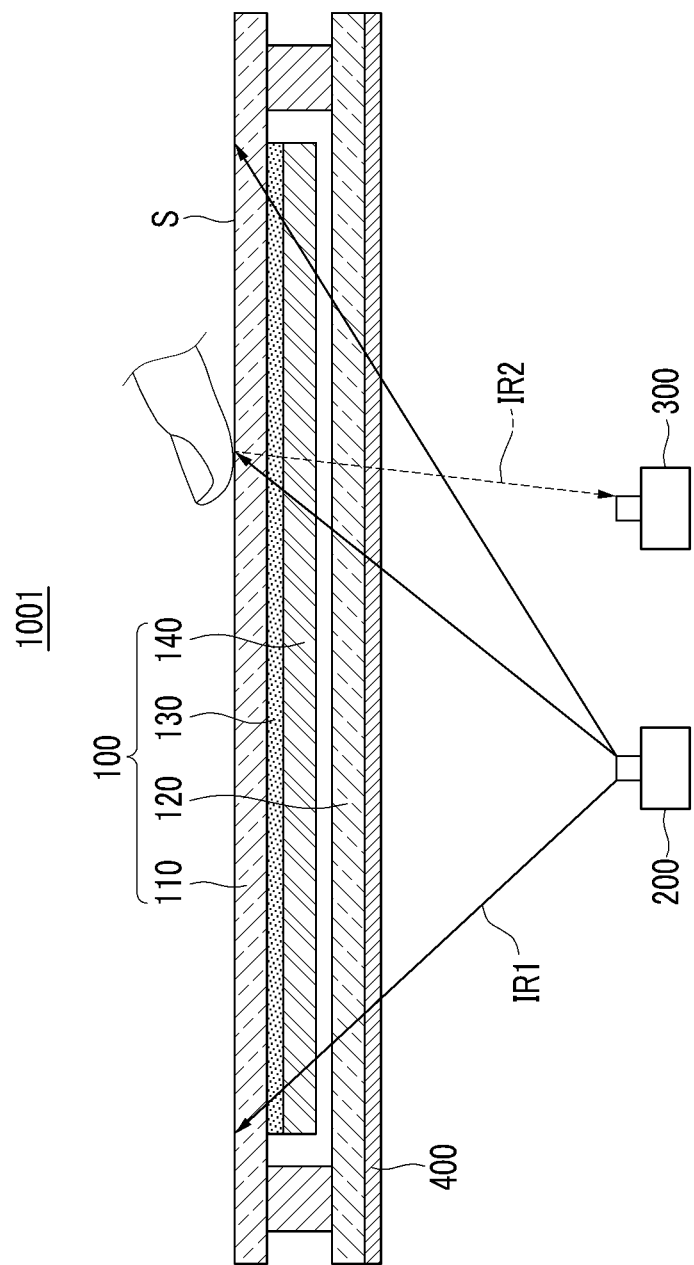
FIG. 1 shows a cross-sectional view of an embodiment of a touch controlled display device.

The described technology will be described more fully hereinafter with reference to the accompanying drawings, in which certain exemplary embodiments of the invention are shown. As those skilled in the art would realize, the described embodiments may be modified in various ways, without departing from the spirit or scope of the present invention.

In addition, parts not related to the description are omitted for clear description, and like reference numerals generally designate like elements and similar constituent elements throughout the specification.

Constituent elements having the same structure throughout the embodiments are generally denoted by the same reference numerals.

The size and thickness of the respective structural components shown in the drawings are arbitrarily illustrated for explanatory convenience, and embodiments are not necessarily limited to those illustrated.

In the drawings, the thickness of layers, films, panels, regions, and the like are exaggerated for clarity. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, throughout the specification, "on" implies being positioned above or below a target element and does not imply being necessarily positioned on the top on the basis of a gravity direction.

An embodiment of a touch controlled display device will be described with reference to FIGS. 1 to 3. In one embodiment, the display panel may comprise an organic light emitting diode (OLED). In other embodiments, the display panel may include a self emissive display device such as a plasma display panel (PDP).

FIG. 1 shows a cross-sectional view of an embodiment of a touch controlled display device.

As shown in FIG. 1, the touch controlled display device 1001 recognizes touch by using infrared, and includes a display panel 100, an infrared source 200, an infrared sensor 300, and an infrared transmission area 400.

In FIG. 1, the display panel 100 is an organic light emitting diode (OLED) display, and includes a first substrate 110, a second substrate 120, a wiring part 130, and an organic light emitting element 140.

The first substrate 110 and the second substrate 110 may be formed with a transparent insulating substrate containing glass, a polymer or the like. The first substrate 110 and the second substrate 120 may face each other, and may be attached together by a sealant. The wiring part 130 and the organic light emitting element 140 may be positioned between the first substrate 110 and the second substrate 120. The first substrate 110 and the second substrate 120 may protect the wiring part 130 and the organic light emitting element 140 from external interference.

The wiring part 130 may include switching and driving thin film transistors 10 and 20 (shown in FIG. 2), and may transmit a signal to the organic light emitting element 140 to drive the organic light emitting element 140. The organic light emitting element 140 may emit light according to a signal transmitted from the wiring part 130.

The organic light emitting element 140 is provided on the wiring part 130.

The organic light emitting element 140 may be provided in a display region on the first substrate 110, and may be formed by a vacuum deposition method using a mask, or by a printing method, or the like. The organic light emitting element 140 may receive a signal from the wiring part 130, and may display an image by the received signal.

The display panel 100 may include a transmission area TA (shown in FIG. 2) for transmitting the light irradiated from the outside and also for transmitting the infrared irradiated from the infrared source 200. The display panel 100 may also include a display area DA (shown in FIG. 2) for displaying images.

An internal configuration of the display panel 100 included in the embodiment of the touch controlled display device 1001 of FIG. 1 will be described with reference to FIG. 2 and FIG. 3.

Figure 2:
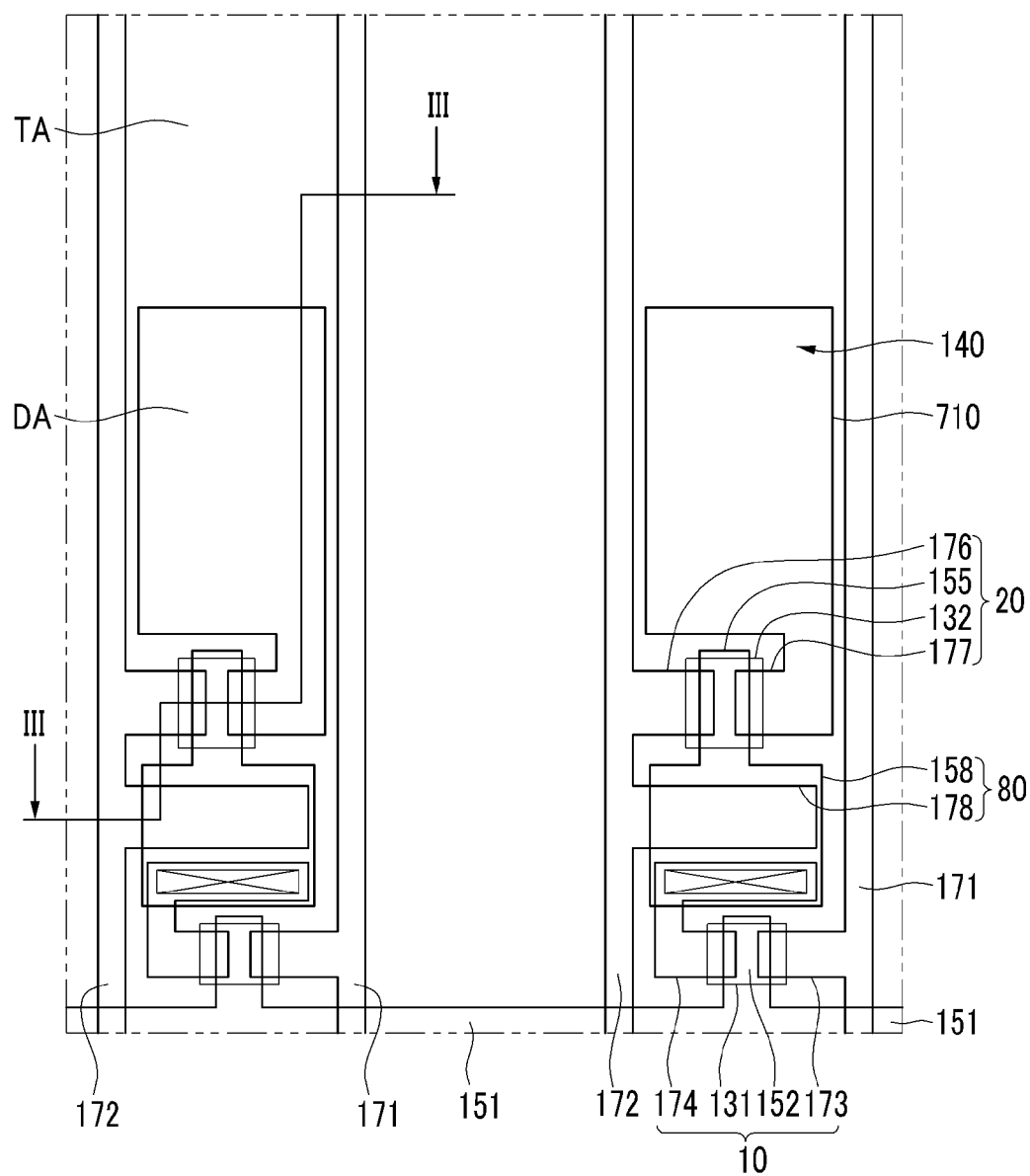
FIG. 2 shows a layout view of a configuration of a pixel of a display panel included in the embodiment of a touch controlled display device of FIG. 1.

FIG. 2 shows a layout view of a configuration of a pixel of a display panel included in the embodiment of a touch controlled display device of FIG. 1. FIG. 3 shows a cross-sectional view with respect to the line of FIG. 2.

Figure 3:
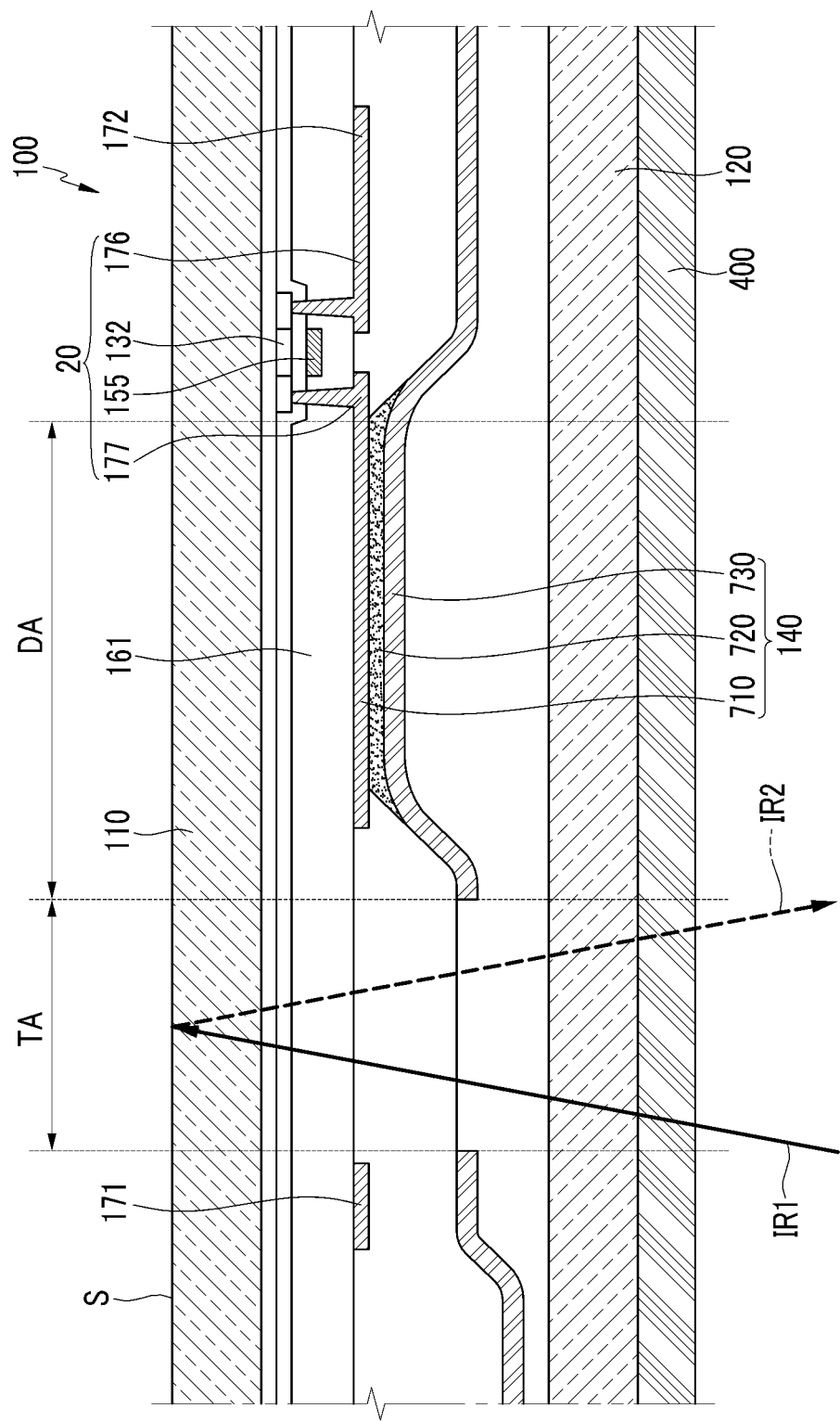
FIG. 3 shows a cross-sectional view with respect to the line of FIG. 2.

One embodiment of the structures of the wiring part 130 and the organic light emitting element 140 are shown in FIGS. 2 and 3. In other embodiments, the wiring part 130 and the organic light emitting element 140 may have different structures which a person skilled in the art may easily change. In some embodiments, an active matrix (AM) type of organic light emitting diode display having a 2Tr-1Cap structure may be used as a display device, in which one pixel includes two thin film transistors (TFTs) and one capacitor. In other embodiments, the number of thin film transistors, the number of capacitors, and the number of lines of the display device may vary. A pixel refers to the smallest unit for displaying an image, and the display device generally displays an image through a plurality of pixels.

As shown in FIG. 2 and FIG. 3, the display panel 100 includes a switching thin film transistor 10, a driving thin film transistor 20, a capacitor 80, and an organic light emitting element 140 for each pixel.

The wiring part 130 includes the switching thin film transistor 10, the driving thin film transistor 20, and the capacitor 80. The wiring part 130 further includes a gate line 151 arranged along one direction of the first substrate 100, a data line 171 insulated from, and crossing the gate line 151, and a common power line 172. In one embodiment, a pixel may be defined by the gate line 151, the data line 171, and the common line 172.

The switching thin film transistor 10 includes a switching semiconductor layer 131, a switching gate electrode 152, a switching source electrode 173, and a switching drain electrode 174. The driving thin film transistor 20 includes a driving semiconductor layer 132, a driving gate electrode 155, a driving source electrode 176, and a driving drain electrode 177.

The switching thin film transistor 10 is used as a switch to select a pixel to emit light. The switching gate electrode 152 is connected to the gate line 151. The switching source electrode 173 is connected to the data line 171. The switching drain electrode 174 is separate from the switching source electrode 173 and is connected to the capacitor plate 158.

The driving thin film transistor 20 applies a driving voltage to the first electrode 710, whereby the organic emission layer 720 of the organic light emitting element 140 emits light in the selected pixel. The driving gate electrode 155 is connected to the capacitor plate 158 connected to the switching drain electrode 174. The driving source electrode 176 and the capacitor plate 178 are connected to the common power line 172. The first electrode 710 of the organic light emitting element 140 extends from the driving drain electrode 177, and the driving drain electrode 177 and the first electrode 710 are connected to each other.

The capacitor 80 includes the capacitor plates 158 and 178 disposed with an interlayer insulating layer 161 interposed therebetween. In one embodiment, the interlayer insulating layer 161 is made of a dielectric material, and the storage capacity of the capacitor 80 is determined by the electric charges stored in the capacitor 80 and the voltage between the capacitor plates 158 and 178.

The switching thin film transistor 10 is driven by a gate voltage applied to the gate line 151, and supplies a data voltage, applied to the data line 171, to the driving thin film transistor 20. A voltage corresponding to the difference between the common voltage, which is supplied from the common power line 172 to the driving thin film transistor 20, and the data voltage, which is supplied from the switching thin film transistor 10, is stored in the capacitor 80. A current corresponding to the voltage stored in the capacitor 80 flows into the organic light emitting element 140 through the driving thin film transistor 20 to control the organic light emitting element 140 to emit light.

The organic light emitting element 140 includes a first electrode 710, an organic emission layer 720 positioned on the first electrode 710, and a second electrode 730 positioned on the organic emission layer 720.

In one embodiment, the first electrode 710 may be an anode, serving as a hole injection electrode, and the second electrode 730 may be a cathode, serving as an electron injection electrode. In other embodiments, the pixel electrode 710 may be a cathode and the common electrode 730 may be an anode, according to a driving method of the display panel 100. Holes and electrons may be injected into the organic emission layer 720 from the first electrode 710 and the second electrode 730, respectively, and when excitons formed by recombination of the injected holes and electrons drop from an excited state to a ground state, the organic emission layer 720 emits light. In some embodiments, the first electrode 710 may include a single-layered or multi-layered light transmissive conducting material including at least one of indium tin oxide (ITO), indium zinc oxide (IZO) and the like. In some embodiments, the second electrode 730 may include a single-layered or multi-layered light reflective conducting material including at least one of aluminum (Al), silver (Ag) and the like. In such an embodiment, the first electrode 710 may be light transmissive, and the second electrode 730 may be light reflective. In some embodiments, the organic emission layer 720 may further include at least one of the electron injection layer (EIL), the electron transport layer (ETL), the hole injection layer (HIL), and the hole transport layer (HTL).

In the embodiment of FIG. 1, in the display panel 100 included in the touch controlled display device 1001, the organic light emitting element 140 emits light in the direction of the first substrate 110. In this embodiment, the display panel 100 is a rear light emitting type that emits light in an upper direction of the display panel 100 to display the image.

The display panel 100 further includes a transmission area TA and a display area DA.

Referring to FIG. 3, the display area DA includes the first electrode 710, the organic emission layer 720, and the second electrode 730. The display area DA displays the image by using the light emitted by the organic emission layer 720. In one embodiment, the transmission area TA is adjacent to the display area DA.

The transmission area TA transmits the light that is irradiated from the outside, and transmits the infrared irradiated from the infrared source 200. The second electrode 730 is provided over the organic light emitting element 140, and a part of the second electrode 730 corresponding to the transmission area TA is cut away. No light reflective material is provided in the transmission area TA, and the first infrared beam IR1 irradiated from the infrared source 200 is irradiated to a surface S of the first substrate 110 through the transmission area TA of the display panel 100.

Referring to FIGS. 1 and 3, the infrared source 200 is provided below the display panel 100, and irradiates the first infrared beam IR1 in the direction of the display panel 100. The first infrared beam IR1 irradiated in the direction of the display panel 100 from the infrared source 200 is irradiated to the surface S of the first substrate 110.

When a touch is applied to the surface S of the first substrate 110, the amount of light of the first infrared beam IR1 irradiated to the surface of the first substrate 110 from the infrared source 200 is changed by the touch, and is transformed into a second infrared beam IR2, and is reflected toward the display panel 100. The second infrared beam IR2 is reflected on the surface S of the first substrate 110 and is irradiated toward the bottom side of the display panel 100 through the transmission area TA of the display panel 100.

The infrared sensor 300 is provided below the display panel 100, and senses the second infrared beam IR2 transformed from the first infrared beam IR1 by touch. The infrared sensor 300 detects the touch point on the display panel 100 by sensing the second infrared beam IR2. A touch signal for the touch point detected by the infrared sensor 300 is transmitted to a controller for driving the display panel 100, and the image caused by the touch signal is displayed on the display panel 100. The infrared sensor 300 senses the surface S of the first substrate 110 by sensing the infrared irradiated to the infrared sensor 300 when no touch is applied to the surface S of the first substrate 110, and detects the touch point for the organic light emitting diode (OLED) display 101 by sensing the second infrared beam IR2, for which the amount of light is changed by the touch. In some embodiments, the infrared sensor 300 may include an infrared sensing camera, an infrared sensor, or the like.

An infrared transmission area 400 is provided between the display panel 100 and the infrared sensor 300. The infrared transmission area 400 transmits the first infrared beam IR1 irradiated by the infrared source 200 and the second infrared beam IR2 reflected by the display panel 100. , The infrared transmission area 400 blocks light emitted by the organic light emitting element 140 of the display panel 100 by blocking light beams of a wavelength in the visible light area. The infrared transmission area 400 may help minimize interference of the first infrared beam IR1 and of the second infrared beam IR2 by the light emitted from the organic light emitting element 140.

Since the infrared transmission area 400 blocks light of wavelength in the visible light area, the light emitted by the organic light emitting element 140 is reflected by a constituent element in the display panel 100 and visibility of the inside of the display panel 100 to the outside is suppressed. Consequently, deterioration of display quality of the touch controlled display device 1001 is suppressed.

The infrared transmission area 400 also blocks external light irradiated to it through the transmission area TA, in the visible light area, thereby suppressing visibility of the inside of the touch controlled display device 1001 through the display panel 100.

In embodiments of the display panel 100 including the organic light emitting element 140 that is a self emissive element, the touch controlled display device 1001 improves overall display quality compared to the a touch controlled display device including a screen display device for displaying images on the screen by using a liquid crystal display panel, requiring an additional light emitting unit such as a backlight unit, or a projector.

Embodiments of the display panel 100 included in the touch controlled display device 1001 can realize a slimmer touch controlled display device 1001 compared to the screen display device included in touch controlled display device including a projector and a screen.

Embodiments of the touch controlled display device 1001 improve infrared transmittance for the display panel 100 since the first infrared beam IR1 irradiated toward the surface S of the display panel 100 from the infrared source 200, and the second infrared beam IR2 reflected on the surface S of the display panel 100 by touch are transmitted to the display panel 100 through the transmission area TA. The touch recognition rate for the touch controlled display device 1001 is improved since the infrared transmittance for the display panel 100 is improved by use of the transmission area TA.

Another embodiment of a touch controlled display device 1002 will be described with reference to FIGS. 4 to 6.

Figure 4:
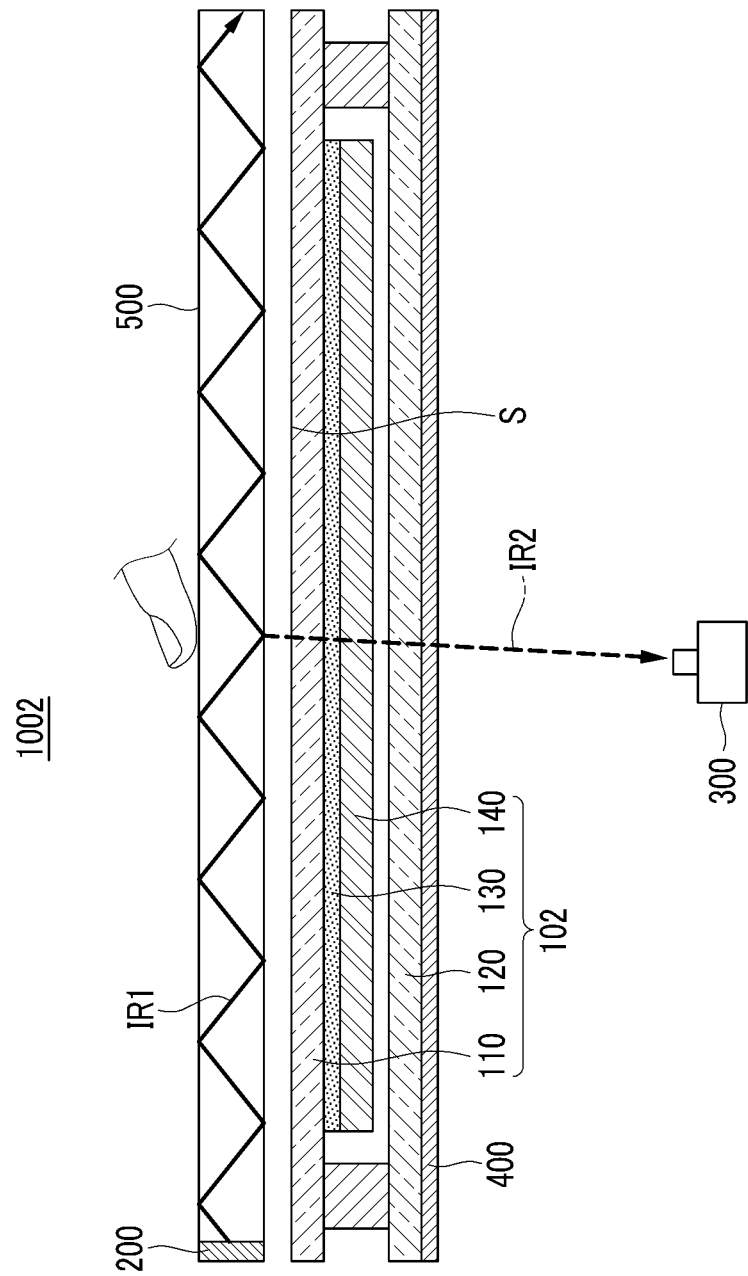
FIG. 4 shows a cross-sectional view of another embodiment of a touch controlled display device.

FIG. 4 shows a cross-sectional view of another embodiment of a touch controlled display device.

As shown in FIG. 4, the touch controlled display device 1002 includes a display panel 102, an infrared source 200, an infrared sensor 300, an infrared transmission area 400, and a total reflection plate 500.

The display panel 102 may be an organic light emitting diode (OLED) display, and may include a first substrate 110, a second substrate 120, a wiring part 130, and an organic light emitting element 140.

The display panel 102 may include a transmission area TA (shown in FIG. 5) for transmitting the light irradiated from the outside and the infrared irradiated by the infrared source 200, and a display area DA (shown in FIG. 5) for displaying images.

Figure 5:
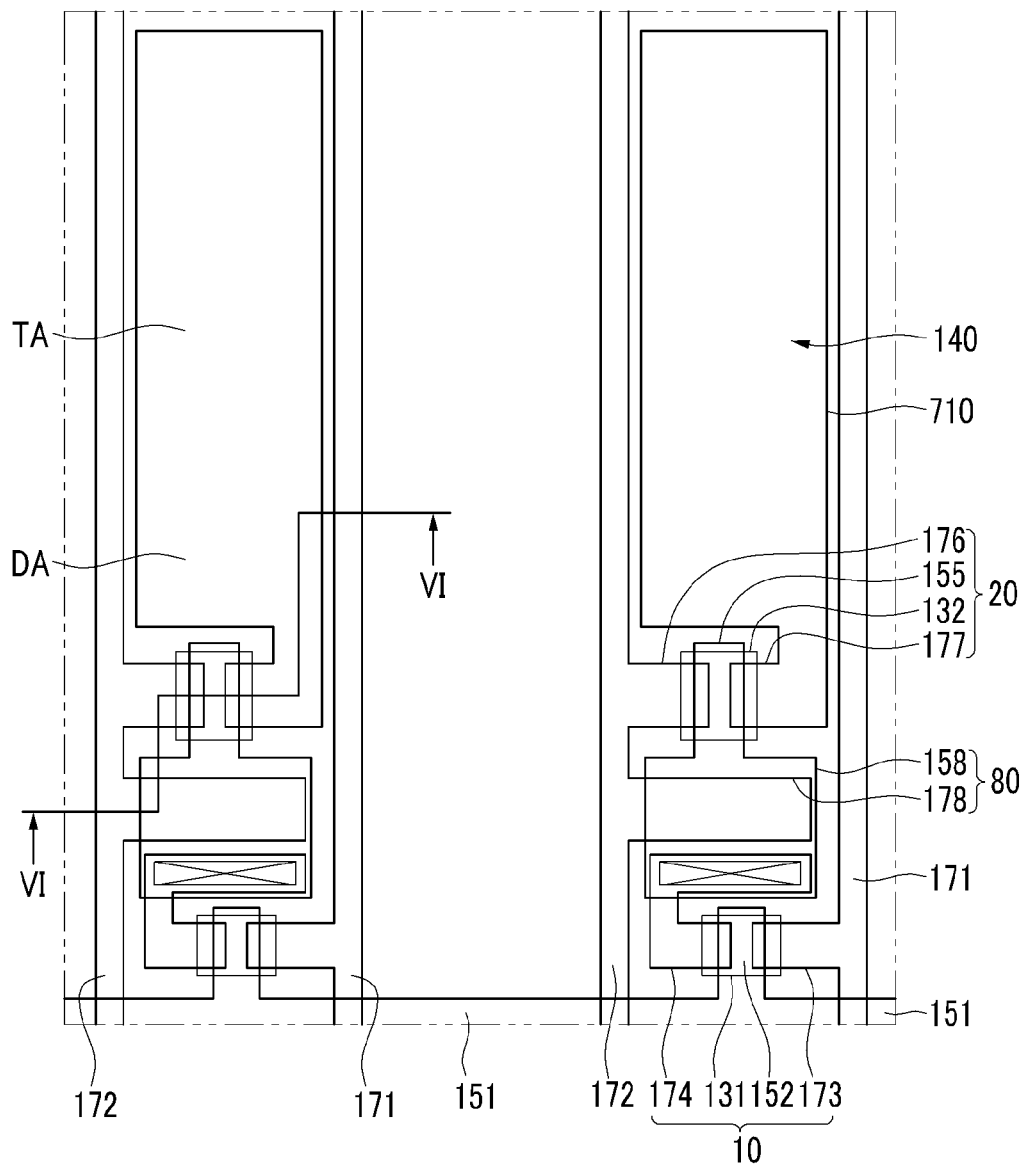
FIG. 5 shows a layout view of a configuration of a pixel of a display panel included in the embodiment of a touch controlled display device of FIG. 4.

FIG. 5 shows a layout view of a configuration of a pixel of a display panel included in the embodiment of a touch controlled display device of FIG. 4. FIG. 6 shows a cross-sectional view with respect to the VI-VI line of FIG. 5.

Figure 6:
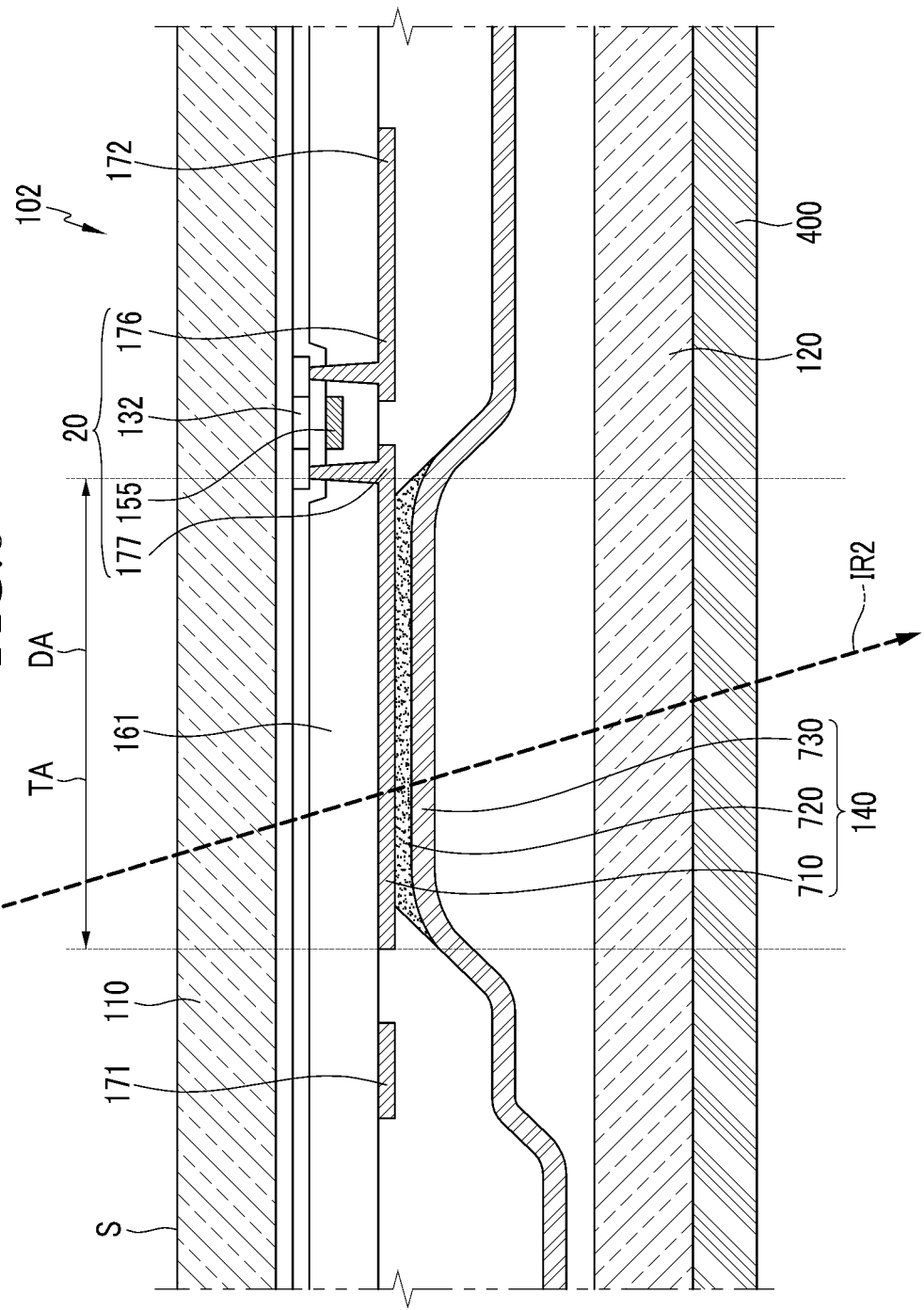
FIG. 6 shows a cross-sectional view with respect to the VI-VI line of FIG. 5.

As shown in FIG. 5 and FIG. 6, the organic light emitting element 140 of the display panel 102 may include a first electrode 710, an organic emission layer 720 on the first electrode 710, and a second electrode 730 on the organic emission layer 720.

The first electrode 710 may include a single-layered or multi-layered light transmissive conducting material including at least one of indium tin oxide (ITO), indium zinc oxide (IZO) and the like, and the second electrode 730 may include a single-layered or multi-layered light transmissive conducting material including at least one of indium tin oxide (ITO), indium zinc oxide (IZO) and the like. In such an embodiment, the first electrode 710 and the second electrode 730 are light transmissive.

In the embodiment of the display panel 102 of FIGS. 4 to 6, the organic light emitting element 140 emits light in the direction of the first substrate 110 and the second substrate 120. In such an embodiment, the display panel 102 is a top and bottom light emitting type for displaying images by emitting light in the top and bottom directions of the display panel 102.

The display panel 102 further includes a transmission area TA and a display area DA.

In the embodiment of FIGS. 4 to 6, the display area DA and the transmission area TA include a first electrode 710, an organic emission layer 720, and a second electrode 730. The display area DA displays images by using light emitted by the organic emission layer 720, the transmission area TA transmits the light irradiated from the outside, and the transmission area TA and the display area DA completely overlap with one another since the first electrode 710 and the second electrode 730 are light transmissive.

In other embodiments, the transmission area and the display may partially overlap one another in the display panel.

Referring to FIG. 4 and FIG. 6, the infrared source 200 is provided on the display panel 102 at an end of a total reflection plate 500 to irradiate a first infrared beam IR1 inside the total reflection plate 500. The first infrared beam IR1 irradiated inside the total reflection plate 500 from the infrared source 200 is totally reflected in the parallel direction of the plate surface of the total reflection plate 500 inside the total reflection plate 500 so as to correspond to the surface S of the first substrate 110 included in the display panel 102.

The total reflection plate 500 neighboring the infrared source 200 is provided on the display panel 102, and totally reflects the first infrared beam IR1 irradiated by the infrared source 200. When a touch is applied on the surface of the total reflection plate 500, total reflection of the first infrared beam IR1 totally reflected inside the total reflection plate 500 is broken by the touch, and the first infrared beam IR1 is transformed into a second infrared beam IR2 irradiated in the direction of the display panel 102. The second infrared beam IR2 is irradiated in the bottom direction of the display panel 102 through the transmission area TA of the display panel 102, and is sensed by the infrared sensor 300.

Another embodiment of a touch controlled display device 1003 will be described with reference to FIGS. 7 to 9.

Figure 7:
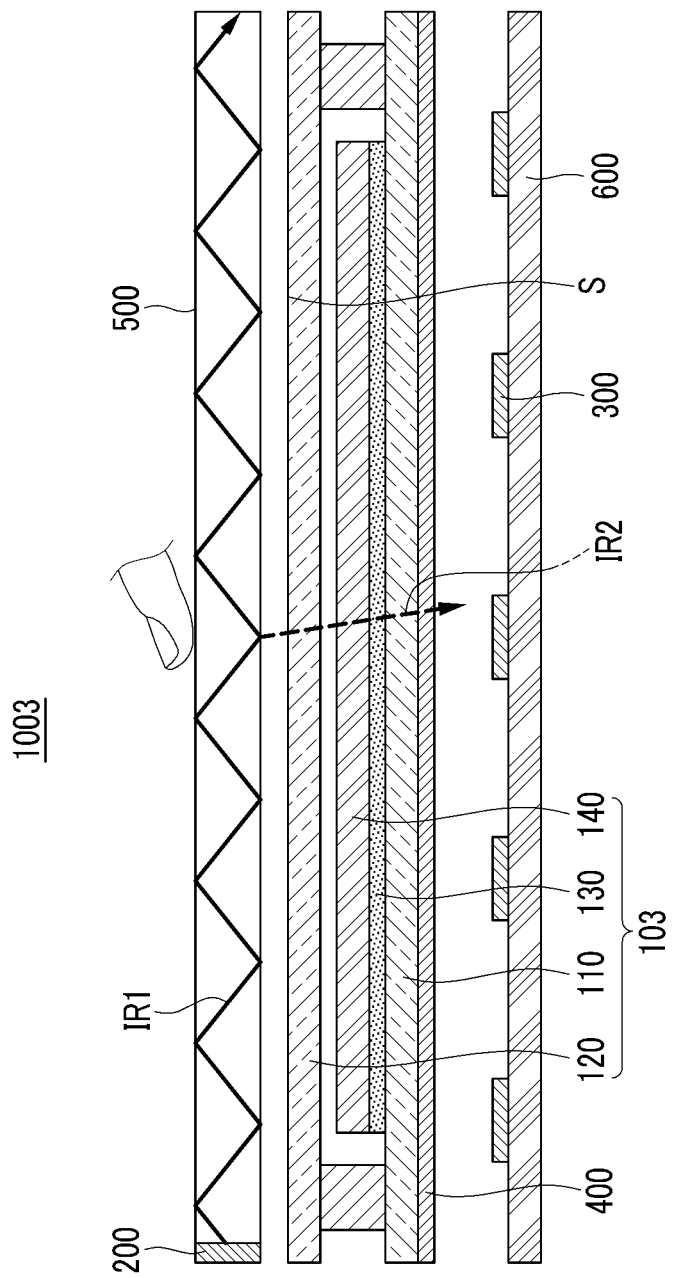
FIG. 7 shows a cross-sectional view of another embodiment of a touch controlled display device.

FIG. 7 shows a cross-sectional view of another embodiment of a touch controlled display device.

In the embodiment of FIG. 7, the touch controlled display device 1003 includes a display panel 103, an infrared source 200, an infrared sensor 300, an infrared transmission area 400, a total reflection plate 500, and a sensing plate 600.

In this embodiment, the display panel 103 is an organic light emitting diode (OLED) display, and it includes a first substrate 110, a second substrate 120, a wiring part 130, and an organic light emitting element 140.

The embodiment of the display panel 103 includes a transmission area TA (shown in FIG. 8) for transmitting the infrared irradiated by the infrared source 200 when the light irradiated from the outside is transmitted, and a display area DA (shown in FIG. 8) for displaying images.

Figure 8:
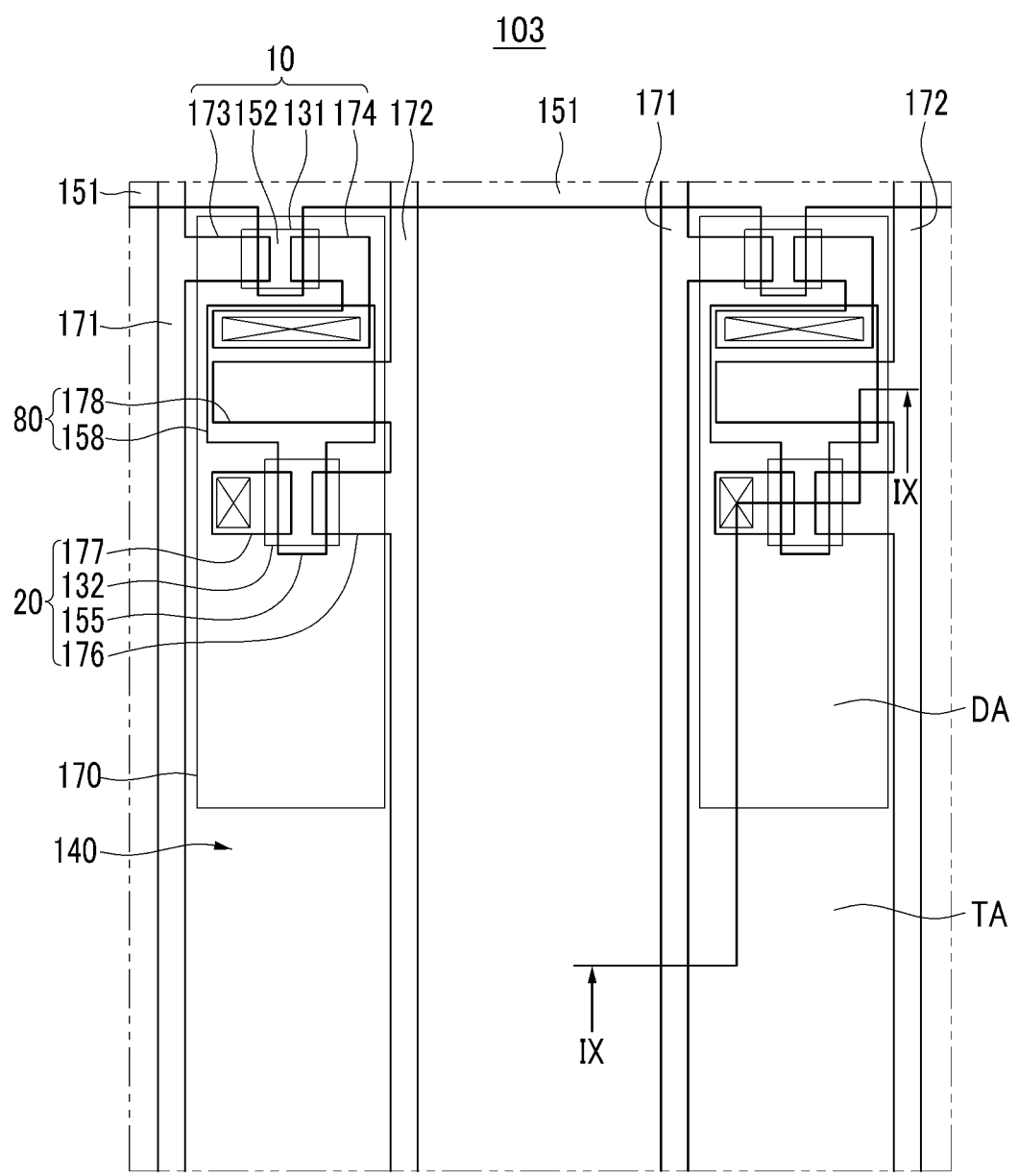
FIG. 8 shows a layout view of a configuration of a pixel of a display panel included in the embodiment of a touch controlled display device of FIG. 7.

FIG. 8 shows a layout view of a configuration of a pixel of a display panel included in the embodiment of a touch controlled display device of FIG. 7. FIG. 9 shows a cross-sectional view with respect to the IX-IX line of FIG. 8.

Figure 9:
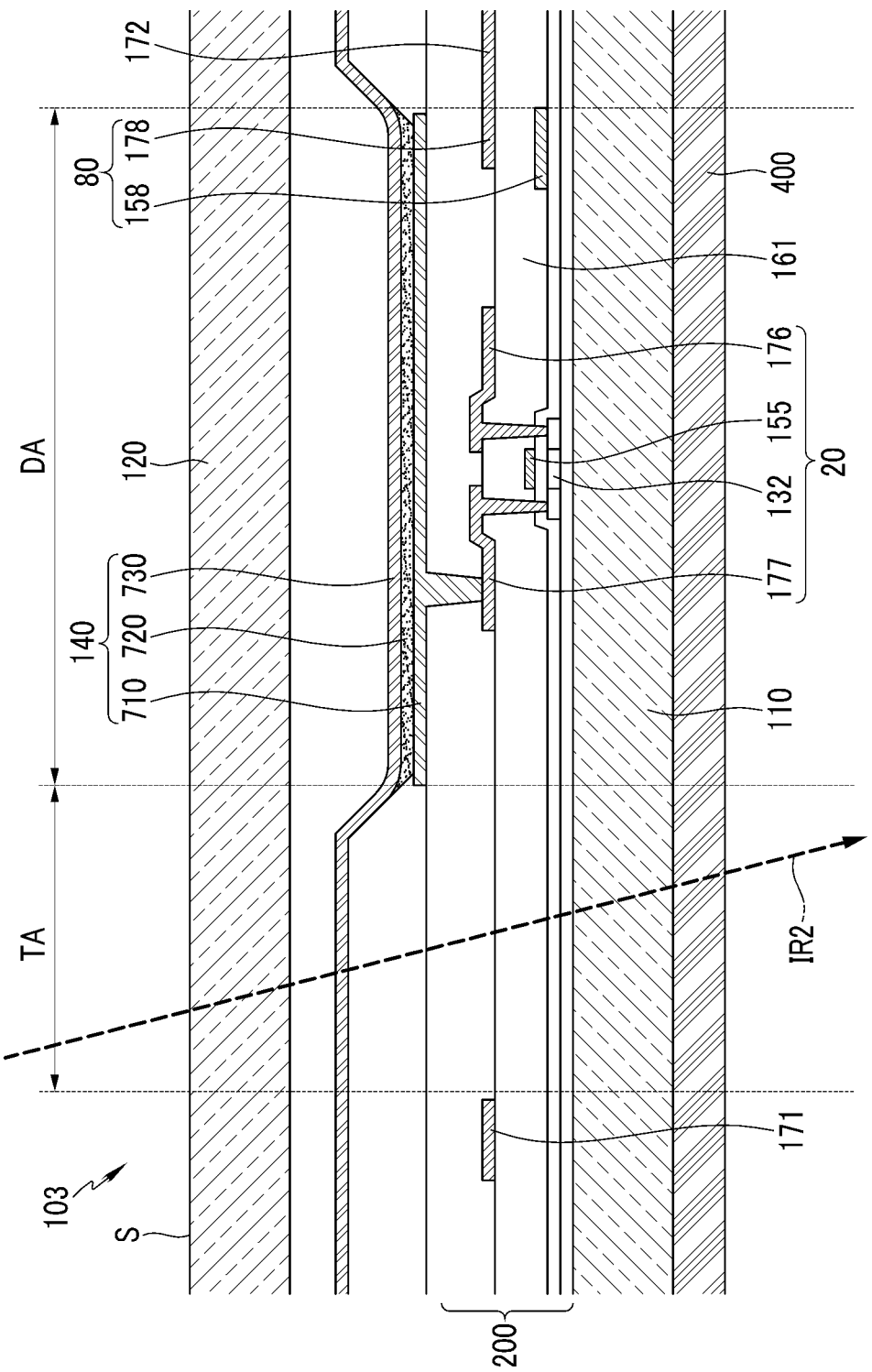
FIG. 9 shows a cross-sectional view with respect to the IX-IX line of FIG. 8.

As shown in FIG. 8 and FIG. 9, the organic light emitting element 140 of the display panel 103 includes a first electrode 710, an organic emission layer 720 provided on the first electrode 710, and a second electrode 730 provided on the organic emission layer 720.

In this embodiment, the first electrode 710 is light reflective, and the second electrode 730 is light transmissive.

In such an embodiment, the organic light emitting element 140 in the display panel 103 included in the touch controlled display device 1003 emits light in the direction of the second substrate 120. The display panel 103 of this embodiment is a front light emitting type that emits light to the top side of the display panel 103 to display images.

Also, the display panel 103 further includes a transmission area TA and a display area DA.

In this embodiment, the transmission area TA is provided near the display area DA.

The transmission area TA transmits the light irradiated from the outside, and it transmits infrared. The second electrode 730 is provided over the organic light emitting element 140, and since the second electrode 730 corresponding to the transmission area TA is light transmissive, infrared is transmitted through the transmission area TA. No light reflective material is provided in the transmission area TA.

Referring to FIGS. 7 and 9, the infrared source 200 is provided on the display panel 103, at an end of the total reflection plate 500 to irradiate a first infrared beam IR1 inside the total reflection plate 500. The first infrared beam IR1 irradiated inside the total reflection plate 500 from the infrared source 200 is totally reflected in the parallel direction of the plate surface of the total reflection plate 500 inside the total reflection plate 500 so as to correspond to the surface S of the first substrate 110 included in the display panel 103.

The total reflection plate 500 neighboring the infrared source 200 is provided on the display panel 103, and totally reflects the first infrared beam IR1 irradiated by the infrared source 200. When a touch is applied on the surface of the total reflection plate 500, total reflection of the first infrared beam IR1 totally reflected inside the total reflection plate 500 is broken by the touch, and the first infrared beam IR1 is transformed into a second infrared beam IR2 irradiated in the direction of the display panel 103. The second infrared beam IR2 is irradiated in the bottom direction of the display panel 103 through the transmission area TA of the display panel 103 and is sensed by the infrared sensor 300.

In some embodiments, a sensing plate 600 may be provided below the display panel 103, and a plurality of infrared sensors 300 may be installed thereon. The infrared sensors 300 installed on the sensing plate 600 may be simultaneously formed on the sensing plate 600 by using a MEMS process such as photolithography, and the like.

While this disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A touch controlled display device comprising:
a display panel comprising a first substrate, a second substrate, and a plurality of pixels between the first and second substrates, wherein the first and second substrates are electrically insulating, wherein each pixel comprises a transmission area and a display area, the transmission area being configured to transmit light through the entire space between the first and second substrates;
an infrared source located outside the display panel and on a side of the second substrate of the display panel and configured to irradiate infrared light toward the first substrate through the second substrate;
an infrared sensor located outside the display panel and on the side of the second substrate of the display panel and configured to detect infrared light from the first substrate through at least one transmission area of the plurality of pixels and further through the second substrate,
wherein each pixel comprises a first electrode, a second electrode, and an organic emission layer between the first and second electrodes, the second electrode being light reflective and a common electrode that is configured to be electrically connected to the plurality of pixels, and wherein a part of the second electrode corresponding to the transmission area is cut away such that the light reflective second electrode is not provided in the transmission area; and
an infrared transmission layer interposed between the display panel and the infrared sensor, the infrared transmission layer configured to transmit infrared light and configured to substantially block visible light.

2. The touch controlled display device of claim 1, wherein the infrared transmission layer is configured to substantially block visible light generated from within the display panel by the organic emission layer interposed between the first and second substrates.

3. The touch controlled display device of claim 1, wherein the transmission area of each pixel is configured to transmit infrared light from the source directed to the first substrate of the display panel.

4. The touch controlled display device of claim 1, further comprising a sensing plate provided over the second opposing substrate, wherein the infrared sensor is provided on the sensing plate.

* * * * *